United States Patent
Chien et al.

(10) Patent No.: US 9,294,199 B2
(45) Date of Patent: Mar. 22, 2016

(54) METHOD FOR GENERATING AN OPTIMIZED RETURN-TO-ZERO PULSE SHAPE AGAINST AGGRESSIVE OPTICAL FILTERING AND AN OPTICAL TRANSMITTER IMPLEMENTING THE METHOD

(75) Inventors: Hung-Chang Chien, Bridgewater, NJ (US); Jianjun Yu, Basking Ridge, NJ (US); Ze Dong, Morristown, NJ (US)

(73) Assignee: ZTE (USA) INC., Austin, TX (US)

( * ) Notice: Subject to any disclaimer, the term of this patent is extended or adjusted under 35 U.S.C. 154(b) by 29 days.

(21) Appl. No.: 14/343,725

(22) PCT Filed: Sep. 13, 2012

(86) PCT No.: PCT/US2012/055121
§ 371 (c)(1),
(2), (4) Date: Mar. 7, 2014

(87) PCT Pub. No.: WO2013/043463
PCT Pub. Date: Mar. 28, 2013

(65) Prior Publication Data
US 2014/0233964 A1 Aug. 21, 2014

Related U.S. Application Data

(60) Provisional application No. 61/536,950, filed on Sep. 20, 2011.

(51) Int. Cl.
*H04B 10/04* (2006.01)
*H04B 10/516* (2013.01)
(Continued)

(52) U.S. Cl.
CPC .......... *H04B 10/5162* (2013.01); *H04B 10/508* (2013.01); *H04B 10/524* (2013.01); *H04J 14/002* (2013.01); *H04J 14/06* (2013.01)

(58) Field of Classification Search
CPC ............. H04B 10/505; H04B 10/5051; H04B 10/5053; H04B 10/5055; H04B 10/50575; H04B 10/50577; H04B 10/50593; H04B 10/50595; H04B 10/516; H04B 10/5162; H04B 10/548; H04B 10/54; H04B 10/5561
USPC .......... 398/183.184, 188, 189, 193, 194, 195, 398/196, 197, 198, 199, 200, 201, 65, 152, 398/158, 159, 186, 187, 185; 359/245, 248, 359/237, 238, 279
See application file for complete search history.

(56) References Cited

U.S. PATENT DOCUMENTS

2008/0239448 A1* 10/2008 Tanaka et al. ................. 359/245
2009/0185810 A1 7/2009 Kaplan et al.
(Continued)

OTHER PUBLICATIONS

Hebebrand, Signal Processing Algorithms in 100Gbit/s Optical Coherent and Non-coherent Receivers with PSK Modulation, Journal of Networks, vol. 5, No. 2, Feb. 2010, 7 pgs.
(Continued)

*Primary Examiner* — Hanh Phan
(74) *Attorney, Agent, or Firm* — Morgan, Lewis & Bockius LLP

(57) ABSTRACT

An optical transmitter comprises: first and second sets of optical in-phase and quadrature modulators; an integrable tunable laser assembly; a first polarization beam splitter that is configured to divide the continuous-waveform optical signal into a x-polarized tributary and a y-polarized tributary, each of the x-polarized tributary and the y-polarized tributary is modulated by one of the first and second sets of optical in-phase and quadrature modulators in accordance with the two respective input signals; a second polarization beam splitter that is configured to combine the modulated x-polarized tributary and the modulated y-polarized tributary into one optical signal; and an optical modulator that is configured to modulate the combined optical signal using a driving voltage, wherein the driving voltage has a bias point that is reduced by a predefined offset from a predefined reference voltage level.

14 Claims, 16 Drawing Sheets

(51) Int. Cl.
  *H04J 14/06* (2006.01)
  *H04B 10/508* (2013.01)
  *H04J 14/00* (2006.01)
  *H04B 10/524* (2013.01)

(56) References Cited

U.S. PATENT DOCUMENTS

2010/0080571 A1* 4/2010 Akiyama et al. ............. 398/184
2011/0026935 A1* 2/2011 Akiyama et al. ............. 398/184
2011/0081153 A1 4/2011 Yu et al.
2011/0150479 A1 6/2011 Kim et al.

OTHER PUBLICATIONS

Zhang, ADC Bandwidth Optimization in Coherent Optical Polarization Multiplexing Quadrature Phase-Shift Keying System, Communications and Photonics Conference and Exhibition (ACP), 2009 Asia, Nov. 2-6, 2009, 6 pgs.

ZTE (USA) Inc., International Search Report and Written Opinion, PCT/US2012/055121, Feb. 27, 2013, 11 pgs.

* cited by examiner

METHOD FOR GENERATING AN OPTIMIZED RETURN-TO-ZERO PULSE SHAPE AGAINST AGGRESSIVE OPTICAL FILTERING AND AN OPTICAL TRANSMITTER IMPLEMENTING THE METHOD

CROSS REFERENCE TO RELATED APPLICATIONS

This Application is a United States National Stage Application filed under 35 U.S.C. §371 of PCT Patent Application Serial No. PCT/US2012/055121 filed on Sep. 13, 2012, which claims the benefit of and priority to U.S. Provisional Patent Application No. 61/536,950 filed on Sep. 20, 2011, which are hereby incorporated by reference in their entireties.

FIELD OF INVENTION

The present invention relates generally to the field of optical communications and, in particular, to a method for generating an optimized return-to-zero pulse shape against aggressive optical filtering.

BACKGROUND

With the rapid growth of emerging bandwidth-demanding network services, next-generation dense wavelength division multiplexed (DWDM) optical transport technologies employing multilevel modulation formats are highly desirable to deliver information bits as many as possible over existing band-limited ITU-T channels. Polarization multiplexing return-to-zero quadrature phase shift keying (PM-RZ-QPSK) with digital coherent detection has been recognized as the next optical transport network standard that mitigates optical link impairments by multiplexing data tributaries at a lower bit-rate so as to be handled easily by DSP-orientated coherent receivers.

Currently, the existing 50 GHz DWDM channel spacing can barely accommodate a 112 Gb/s PM-QPSK signal. But since the line rate for the new-generation PM-QPSK products may go up to 128 Gb/s due to the use of soft-decision forward error correction (FEC) with a higher overhead, there could be significant penalties resulting from the insufficient channel bandwidth, which will be even more problematic when considering the bandwidth narrowing effect caused by a series of in-line optical filters such as reconfigurable optical add-drop multiplexer (ROADM) along the optical transmission path.

Return-to-zero (RZ) pulse is usually more tolerant to filtering and nonlinear degradations than non return-to-zero (NRZ) pulse. But if the channel spacing is 25 GHz or below for supporting future terabit Nyquist-WDM superchannel, the conventional RZ pulse will not function well when combining ten 128 Gb/s subchannels under such aggressive optical filtering.

SUMMARY

Accordingly, the present invention is directed to new methods for generating an optimized return-to-zero pulse shape against aggressive optical filtering using established optical transmitters (e.g., PM-QPSK transmitters).

In some embodiments, provided is a method of generating a signal having an optimized return-to-zero pulse shape using an optical modulator having an input terminal and an output terminal. The method comprises: applying a clock signal and a driving voltage to the optical modulator, wherein the driving voltage has a bias point at a predefined reference voltage level; modifying the driving voltage by reducing the bias point of the driving voltage from the predefined reference voltage level by a predefined offset; receiving an optical signal at the input terminal, wherein the optical signal includes an x-polarized tributary and a y-polarized tributary that is pulse-to-pulse aligned with the x-polarized tributary; modulating the optical signal using the modified driving voltage; and exporting the modulated optical signal at the output terminal.

In some embodiments, an optical transmitter comprise: first and second sets of optical in-phase and quadrature modulators, each set being coupled to a respective pair of electrical amplifiers for receiving two respective input signals; an integrable tunable laser assembly that is configured to generate a continuous-waveform optical signal; a first polarization beam splitter that is configured to divide the continuous-waveform optical signal into a x-polarized tributary and a y-polarized tributary, wherein each of the x-polarized tributary and the y-polarized tributary is modulated by one of the first and second sets of optical in-phase and quadrature modulators in accordance with the two respective input signals applied to the respective pair of electrical amplifiers; a second polarization beam splitter that is configured to combine the modulated x-polarized tributary and the modulated y-polarized tributary into one optical signal; and an optical modulator that is configured to modulate the combined optical signal using a driving voltage, wherein the driving voltage has a bias point that is reduced by a predefined offset from a predefined reference voltage level.

BRIEF DESCRIPTION OF THE DRAWINGS

The accompanying drawings, which are included to provide a further understanding of the invention and are incorporated herein and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on other types of optical signal transmitting systems.

There were experimental results indicating that, under the narrowband optical filtering, the sensitivity of an optical receiver can be improved by optimizing the RZ pulse shape such that the signal's phase shape was optimized when its optical spectrum shows "zero" dip at the center wavelength, i.e., a flat optical spectrum over the signal bandwidth. However, the prior statement may not be right since the end-to-end channel response is similar to a low-pass filter, which requires the transmitting signal to be high-pass filtered to the extent that equalizes the RF spectrum of the received signal.

In this application, two approaches for optimizing the RZ pulse shape against optical filtering are disclosed, which are referred to as "type-I" and "type-II" optimized RZ (ORZ), respectively. According to some embodiments of the present application, a "6.26 dB" dip at the center wavelength can fit a 128 Gb/s PM-QPSK signal with the type-I ORZ pulse shape into a 22-GHz Gaussian channel with a low optical signal-to-noise (OSNR) penalty. The receiver sensitivity can be further improved by employing the type-II ORZ pulse shape. Both ORZ schemes can effectively overcome the filtering effects by adjusting the bias point and/or increasing the driving voltage of an optical modulator within an optical transmitter without introducing an extra complexity to the established PM-QPSK optical transmitting systems.

Figure 1A:
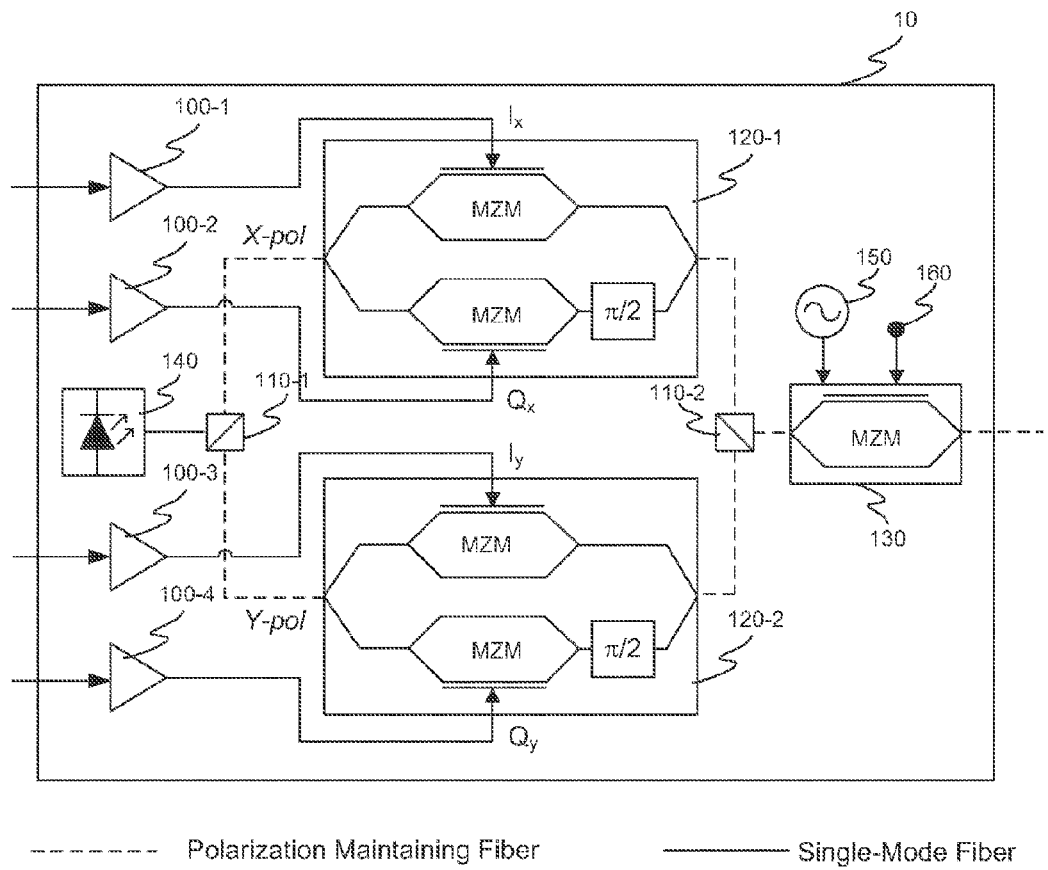
FIG. 1A is an exemplary illustration of an optical transmitter and components therein including an optical modulator in accordance with some embodiments of the present invention.

FIG. 1A is an exemplary illustration of an optical transmitter 10 and components therein including an optical modulator 130 in accordance with some embodiments of the present invention. As shown in FIG. 1A, the fully-integrated optical transmitter 10 typically comprises an integrable tunable laser assembly (ITLA) 140, two sets of optical in-phase (I) and quadrature (Q) modulators 120-1 and 120-2, two polarization beam splitters (PBS) 110-1 and 110-2, a Mach-Zehnder (MZ) return-to-zero (RZ) modulator 130, and four electrical amplifiers (EA) 100-1 to 100-4.

Figure 1B:
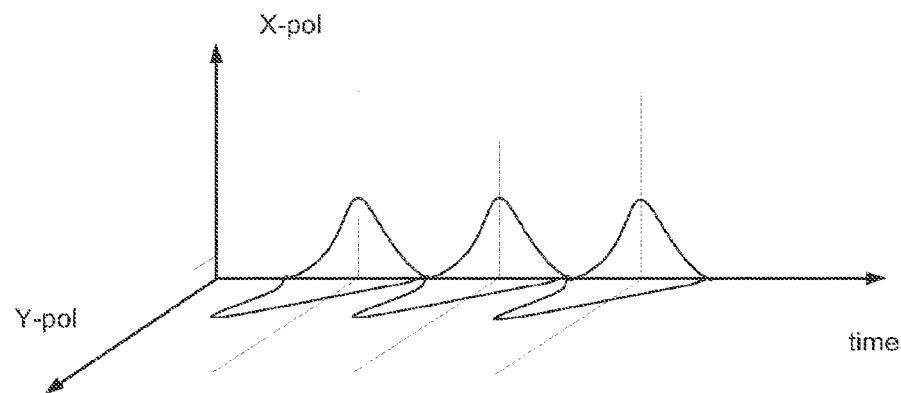
FIG. 1B is an exemplary illustration of x-polarized and y-polarized tributaries generated by the optical transmitter in accordance with some embodiments of the present invention.

In some embodiments, the continuous-waveform (CW) optical signal launched from the ITLA 140 is divided into x-polarized and y-polarized orthogonal tributaries by the PBS 110-1, which are modulated by the data symbols at the I-Q modulators 120-1 and 120-2, respectively. Note that the data symbols are provided to the I-Q modulators 120-1 and 120-2 through the two electrical amplifier (EA) pairs. Inside the optical transmitter 10, the optical paths for both polarized signals are made to be substantially equal, so that the x-polarized and y-polarized output tributaries after the MZ modulator 130 are substantially pulse-to-pulse aligned as illustrated in FIG. 1B, which is an exemplary illustration of x-polarized and y-polarized tributaries generated by the optical transmitter in accordance with some embodiments of the present invention. The MZ modulator 130 is controlled by a clock signal 150 and a voltage source 160. As will be described below, the output of the MZ modulator 130 has a BER performance measured against the optical filtering by adjusting the bias point and the amplitude of the driving voltage at the voltage source 160, respectively. A typical RZ pulse shape is realized by biasing a Mach-Zehnder optical modulator (MZM) at its 50% transmission (i.e., its quadrature point), which gives output optical pulses with a full-width at half maximum (FWHM) of 50% of the bit duration, namely 50% RZ.

Figure 1C:
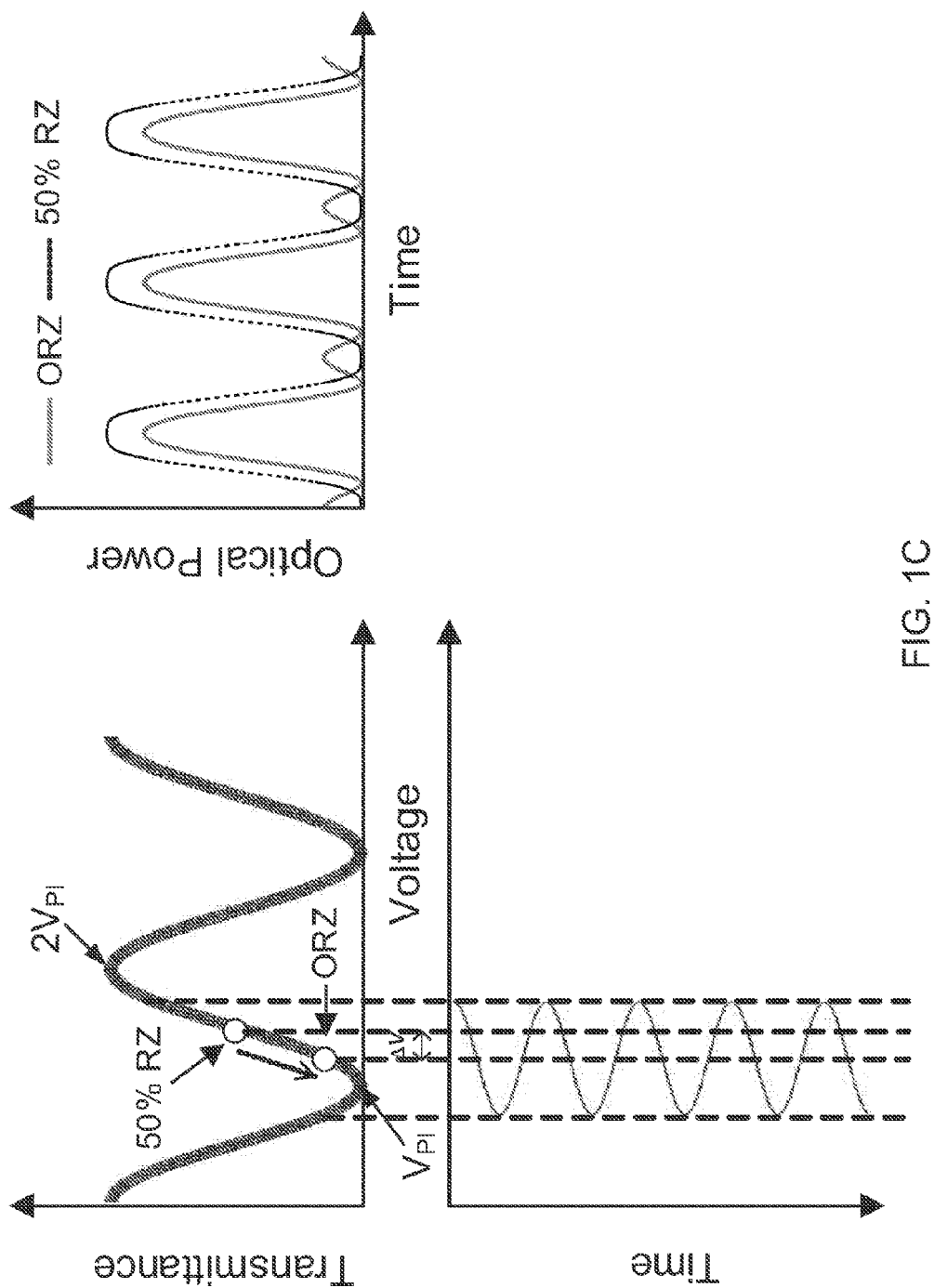
FIG. 1C is an exemplary illustration of shifting the bias point of the driving voltage of the optical modulator by a predefined offset in accordance with some embodiments of the present invention.

In order to enhance the tolerance against fiber-optic channel effects as a result of low-pass filtering, FIG. 1C is an exemplary illustration of the type-I ORZ pulse shape that shifts the bias point of the driving voltage of the optical modulator by a predefined offset in accordance with some embodiments of the present invention. The type-I approach proposes that one can offset the bias of the driving voltage by ΔV from the original bias point for 50% RZ toward the transmission minimum while maintaining both the driving voltage's amplitude and the clock frequency. As such, the optical carrier will be suppressed to a certain extent that helps to equalize the frequency response of the carried signal. Although the type-I approach has a better filtering tolerance, the optimized RZ (ORZ) pulse exhibits less extinction ratio (ER) than that of the 50% RZ one, which may lower the receiver sensitivity if no filtering effects are considered.

Figure 1D:
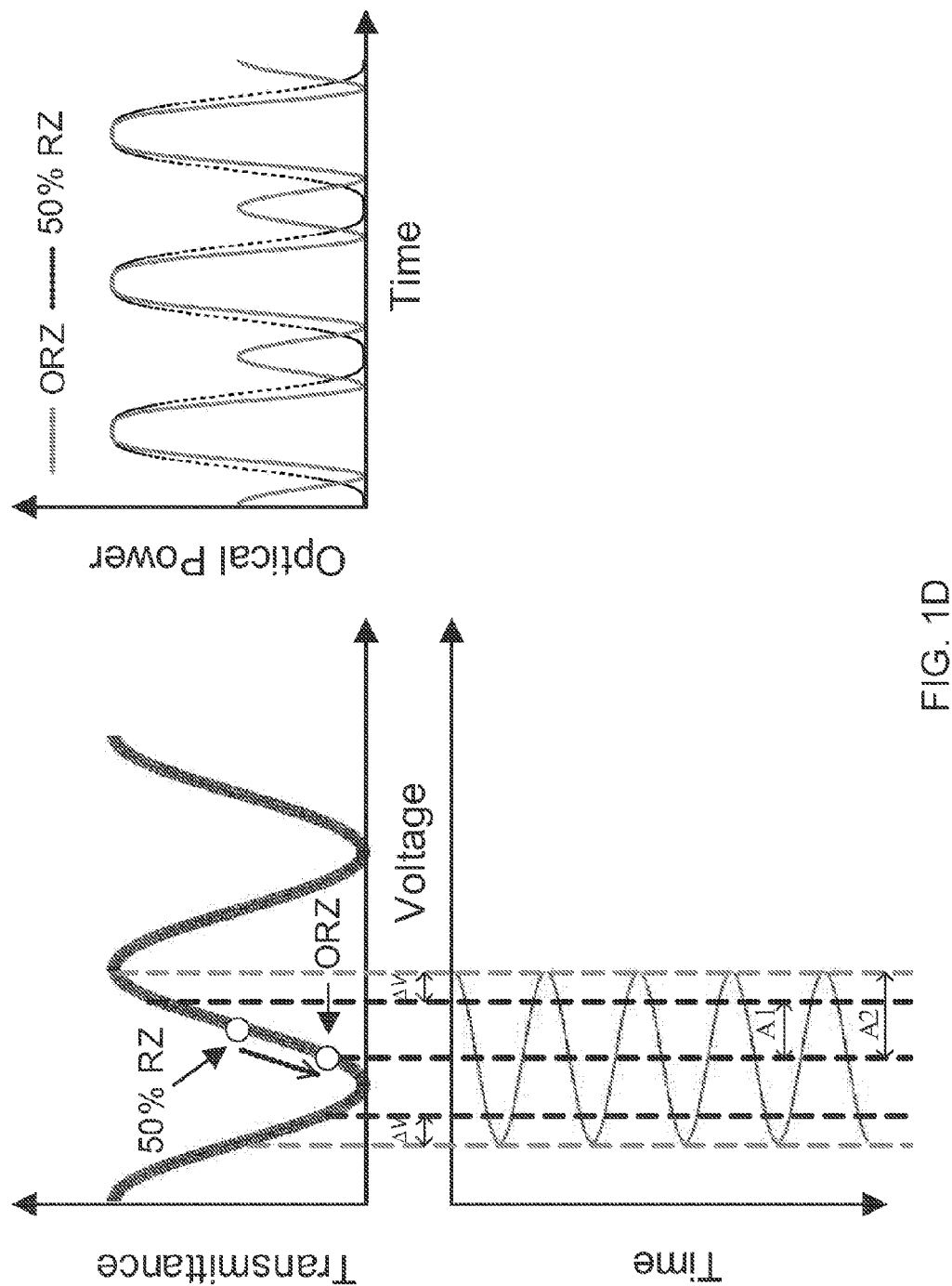
FIG. 1D is an exemplary illustration of increasing the amplitude of the bias-shifted driving voltage of the optical modulator by a predefined amount in accordance with some embodiments of the present invention.

FIG. 1D is an exemplary illustration of the type-II ORZ pulse shape by increasing the amplitude of the bias-shifted driving voltage of the optical modulator from $A_1$ to $A_2$ by predefined amount of 2ΔV in accordance with some embodiments of the present invention. As shown in FIG. 1D, the type-II approach generates ORZ pulses with an equivalent output ER to that of 50% RZ pulses by increasing the driving voltage. As such, the suggested amount of the increased peak-to-peak driving voltage can fully utilize the modulation swing between 0% and 100% transmission of the MZM. As a result, the output type-II ORZ pulse can achieve a better filtering tolerance at no cost of the ER reduction.

Figure 1E:
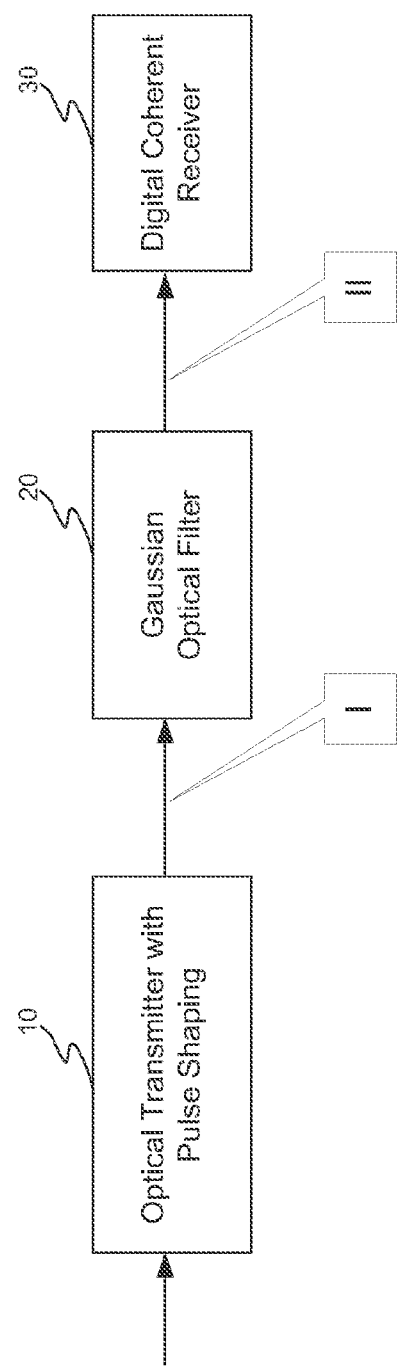
FIG. 1E is an exemplary illustration of an optical signal transmission system including an optical transmitter, an optical filter and an optical receiver in accordance with some embodiments of the present invention.
Figure 1F:
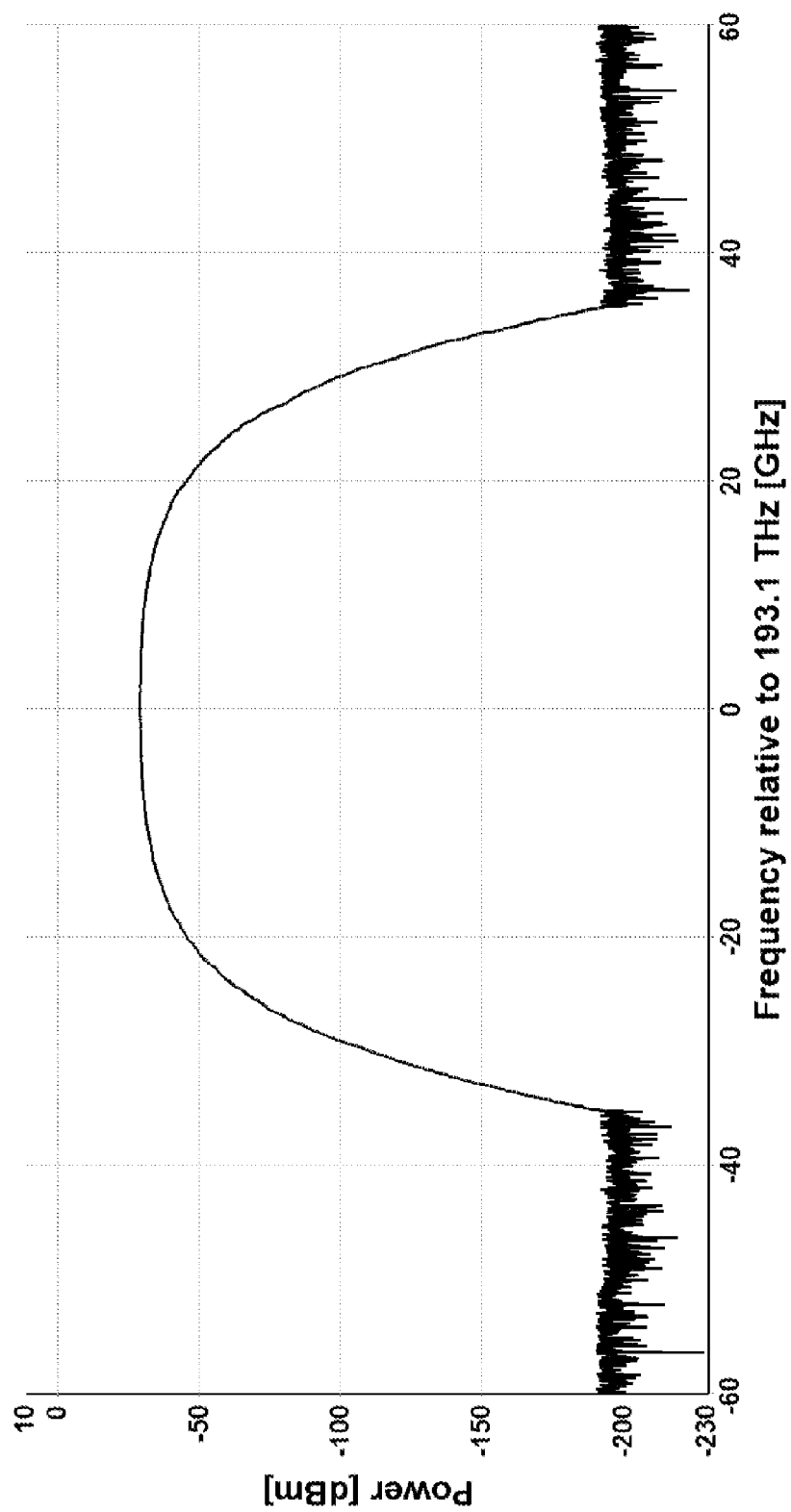
FIG. 1F is an exemplary illustration of the simulated amplified spontaneous emission spectrum of the optical filter in accordance with some embodiments of the present invention.

In order to simulate the BER performance of the optimized RZ pulse shaping according to the type-I or type-II approach, FIG. 1E is an exemplary illustration of an optical signal transmission system including an optical transmitter 10 with various pulse shapes (including the type-I and type-II pulse shapes), an optical filter 20, and an optical receiver 30 in accordance with some embodiments of the present invention. For example, the system includes a PM-QPSK transmitter 10 at 128 Gb/s with an ORZ pulse shaping, a digital coherent receiver 30 with an ADC bandwidth of 20 GHz and an oversampling rate of 8, and a 2nd-order Gaussian optical filter 20 with a 3-dB bandwidth of 22 GHz located between the transmitter 10 and the receiver 30 for simulating the severe channel effect. FIG. 1F is an exemplary illustration of the simulated amplified spontaneous emission spectrum of the Gaussian optical filter 20 in accordance with some embodiments of the present invention.

Figure 2A:
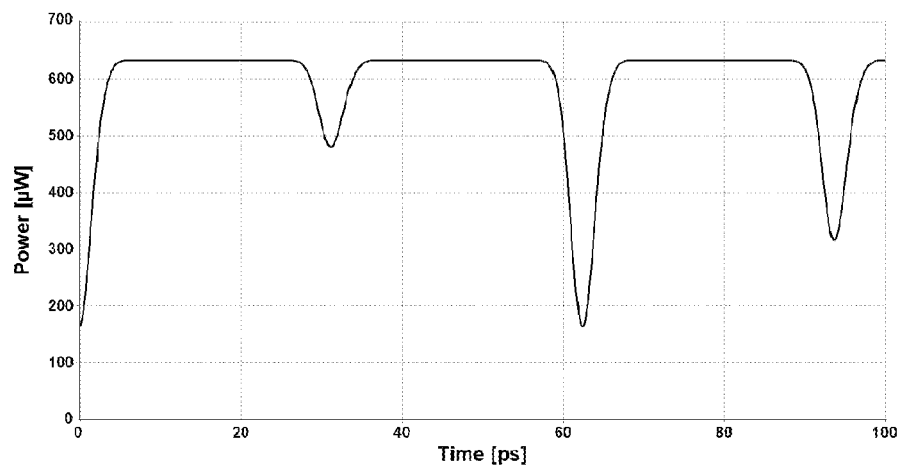
FIGS. 2A to 2C are exemplary illustrations of a simulated time waveform of an optical signal before the Gaussian optical filter with a non-return-to-zero (NRZ) pulse shape and its associated optical spectra before and after the Gaussian optical filter, respectively, in accordance with some embodiments of the present invention.
Figure 2B:
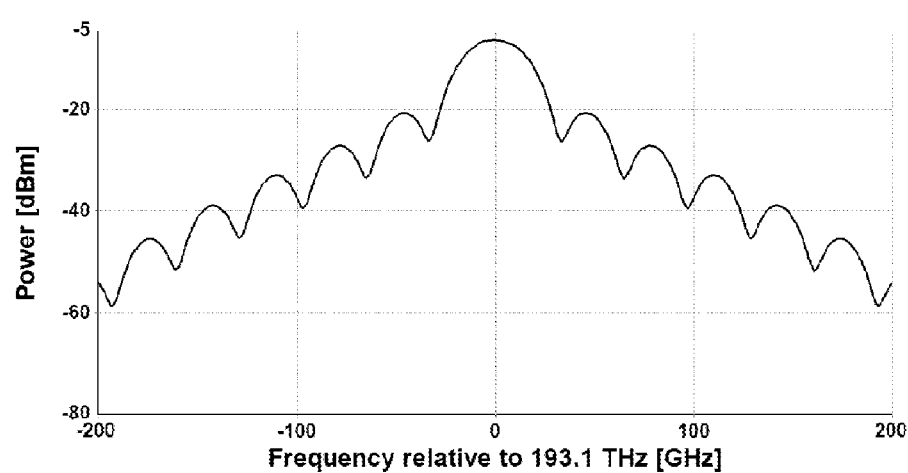
Figure 2C:
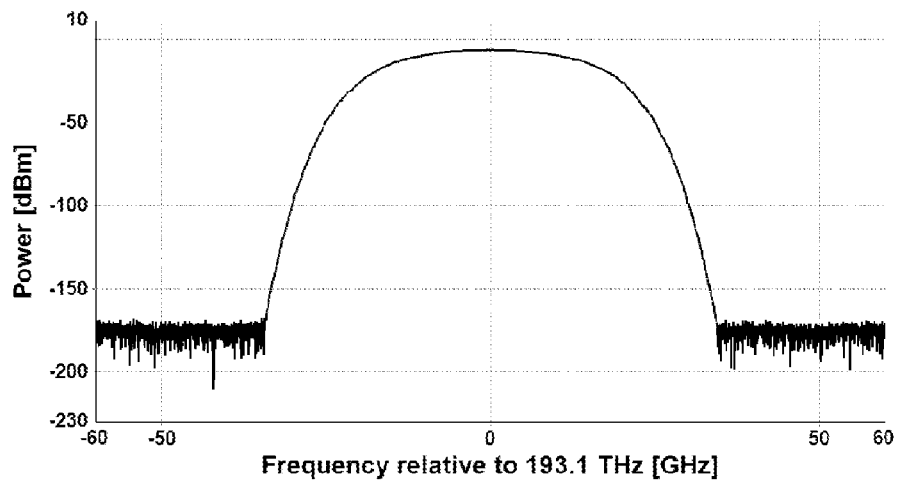

FIG. 2A is an exemplary illustration of a simulated time waveform of an optical signal sampled before the Gaussian optical filter 20 with a conventional non-return-to-zero (NRZ) pulse shape. FIGS. 2B and 2C are exemplary illustrations of the time waveform's associated optical spectra before and after the Gaussian optical filter, respectively, in accordance with some embodiments of the present invention.

Figure 2D:
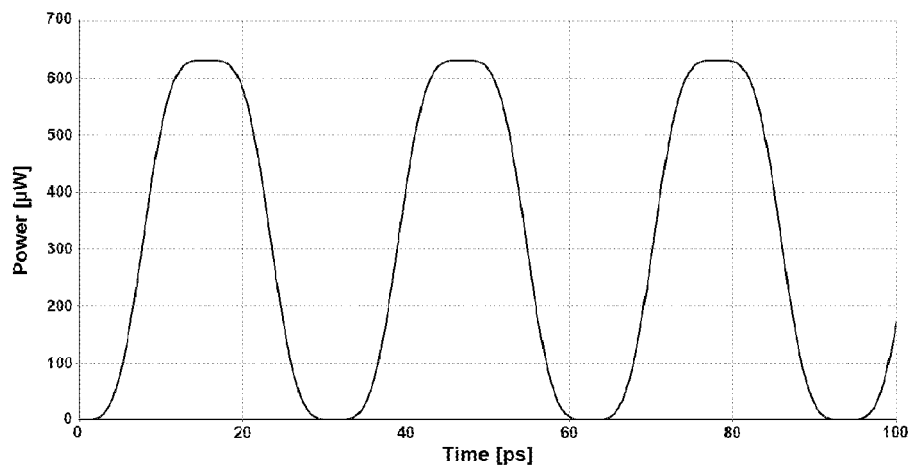
FIGS. 2D to 2F are exemplary illustrations of the simulated time waveform of an optical signal before the Gaussian optical filter with a 50% return-to-zero (RZ) pulse shape biased at $8/16\,V_\pi$ and its associated optical spectra before and after the Gaussian optical filter, respectively, in accordance with some embodiments of the present invention.
Figure 2E:
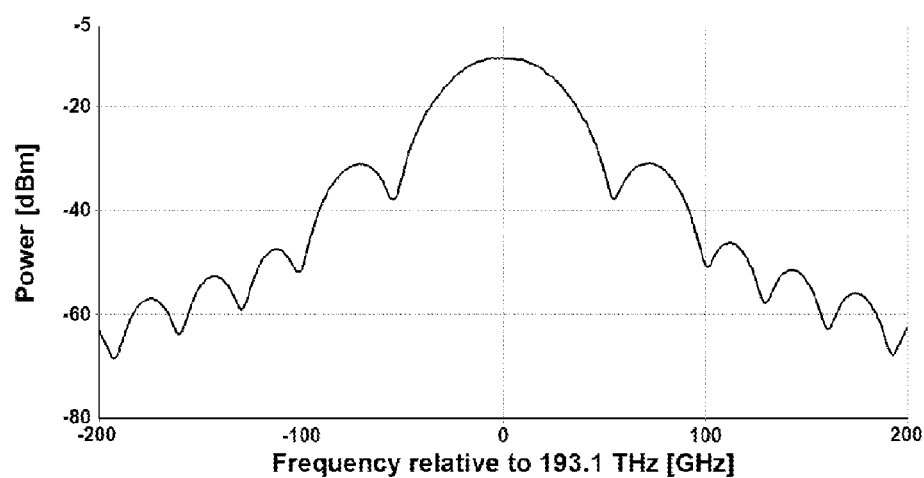
Figure 2F:
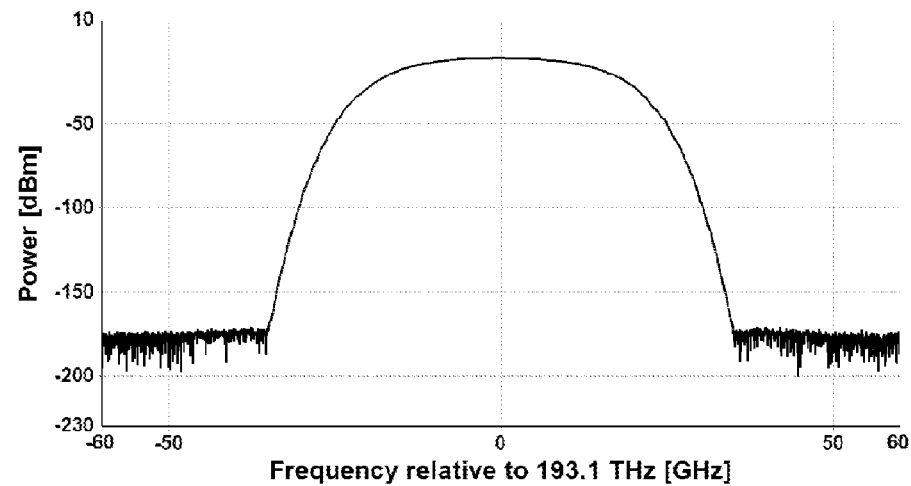

FIG. 2D is an exemplary illustration of a simulated time waveform of an optical signal sampled before the Gaussian optical filter with a 50% return-to-zero (RZ) pulse shape biased at $8/16 V_\pi$. FIGS. 2E and 2F are exemplary illustrations of the time waveform's associated optical spectra before and after the Gaussian optical filter, respectively, in accordance with some embodiments of the present invention. Note that $V_\pi$ is the half-wave voltage of an MZM.

Figure 2G:
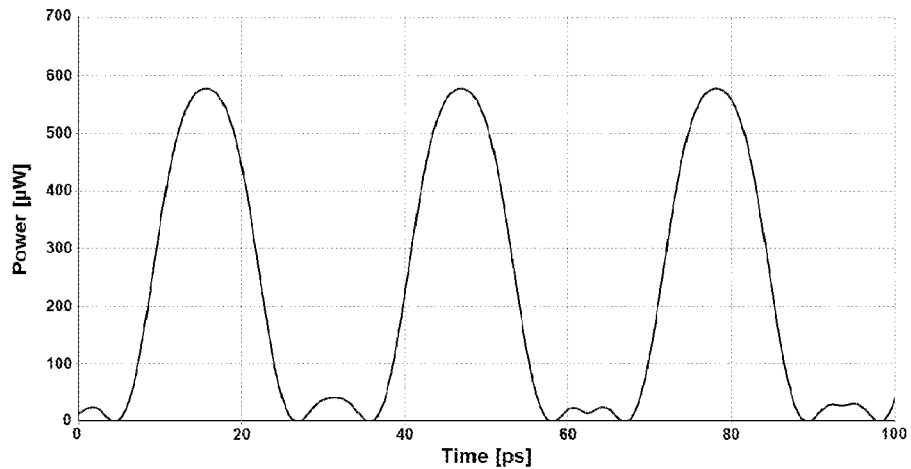
FIGS. 2G to 2I are exemplary illustrations of the simulated time waveform of an optical signal before the Gaussian optical filter with a 50% return-to-zero (RZ) pulse shape biased at $11/16\,V_\pi$ and its associated optical spectra before and after the Gaussian optical filter, respectively, in accordance with some embodiments of the present invention.
Figure 2H:
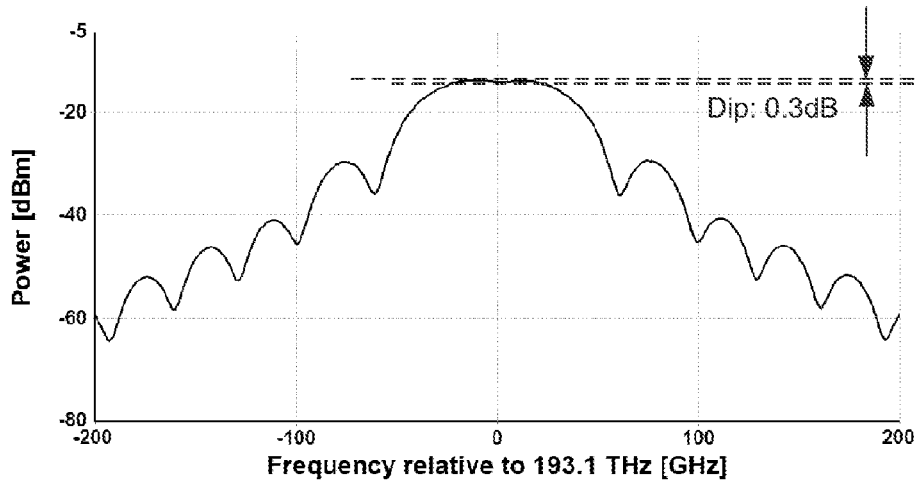
Figure 2I:
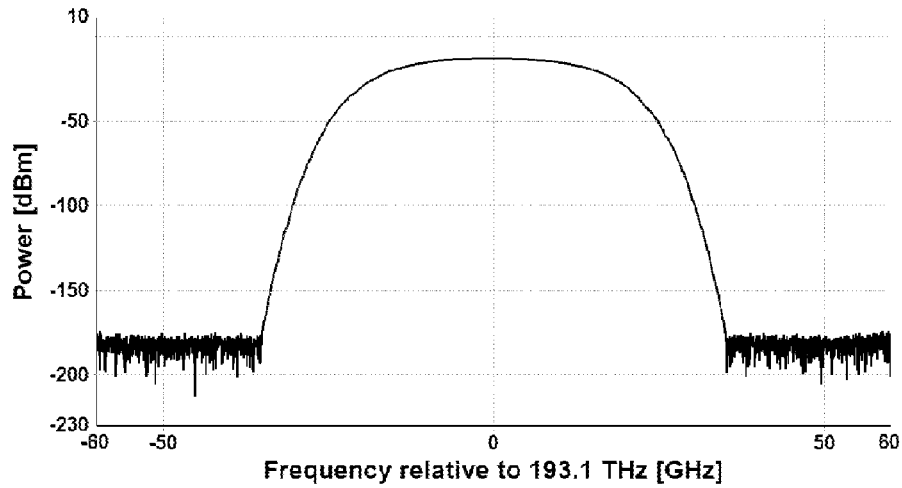

FIG. 2G is an exemplary illustration of a simulated time waveform of an optical signal sampled before the Gaussian optical filter with a 50% return-to-zero (RZ) pulse shape biased at $11/16 V_\pi$ (i.e., a $3/16 V_\pi$ offset from the 50% RZ pulse shape). FIGS. 2H and 2I are exemplary illustrations of the time waveform's associated optical spectra before and after the Gaussian optical filter, respectively, in accordance with some embodiments of the present invention.

Figure 2J:
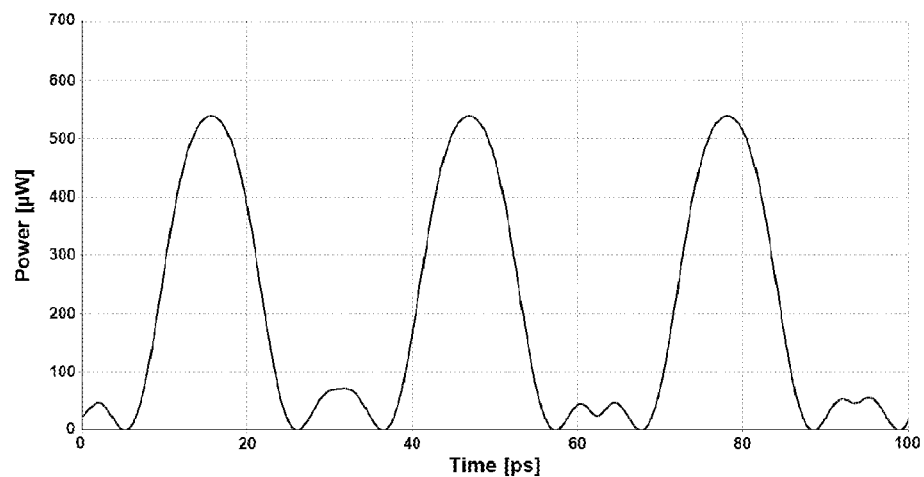
FIGS. 2J to 2L are exemplary illustrations of the simulated time waveform of an optical signal before the Gaussian optical filter with a 50% return-to-zero (RZ) pulse shape biased at $12/16\,V_\pi$ and its associated optical spectra before and after the Gaussian optical filter, respectively, in accordance with some embodiments of the present invention.
Figure 2K:
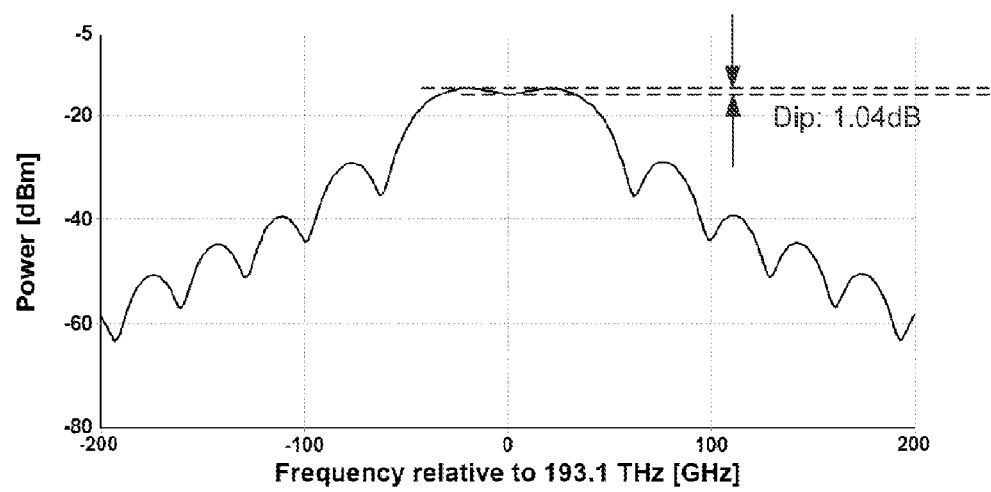
Figure 2L:
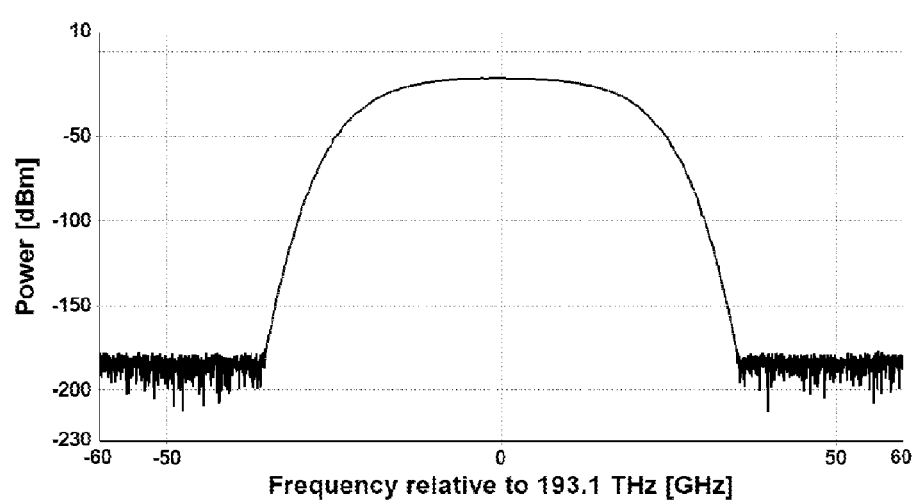

FIG. 2J is an exemplary illustration of a simulated time waveform of an optical signal before the Gaussian optical filter with a 50% return-to-zero (RZ) pulse shape biased at $12/16 V_\pi$ (i.e., a $4/16 V_\pi$ offset from the 50% RZ pulse shape). FIGS. 2K and 2l are exemplary illustrations of the time waveform's associated optical spectra before and after the Gaussian optical filter, respectively, in accordance with some embodiments of the present invention.

Figure 2M:
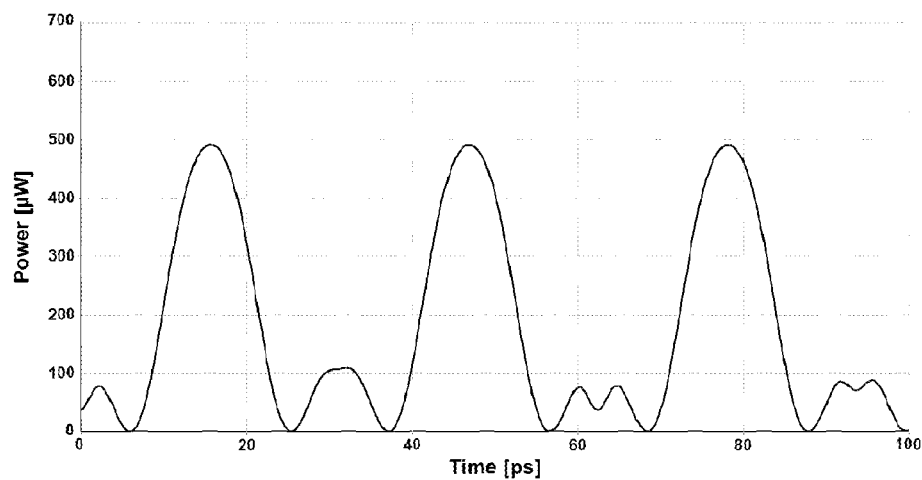
FIGS. 2M to 2O are exemplary illustrations of the simulated time waveform of an optical signal before the Gaussian optical filter with a 50% return-to-zero (RZ) pulse shape biased at $13/16\,V_\pi$ and its associated optical spectra before and after the Gaussian optical filter, respectively, in accordance with some embodiments of the present invention.
Figure 2N:
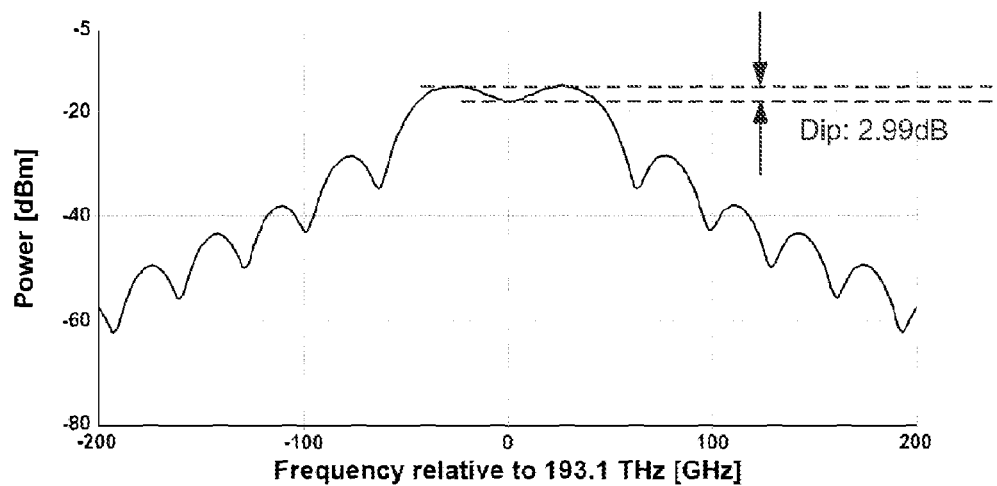
Figure 2O:
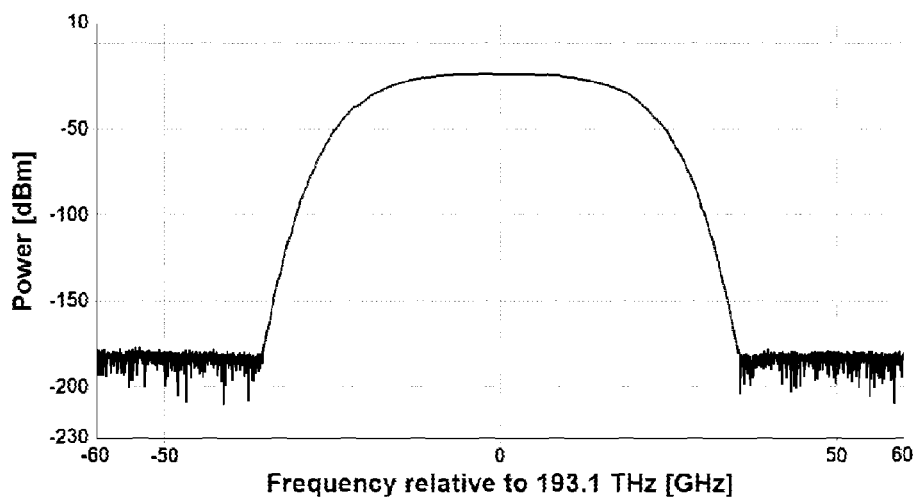

FIG. 2M is an exemplary illustration of a simulated time waveform of an optical signal before the Gaussian optical filter with a 50% return-to-zero (RZ) pulse shape biased at $13/16 V_\pi$ (i.e., a $5/16 V_\pi$ offset from the 50% RZ pulse shape). FIGS. 2M and 2O are exemplary illustrations of the time waveform's associated optical spectra before and after the Gaussian optical filter, respectively, in accordance with some embodiments of the present invention.

Figure 2P:
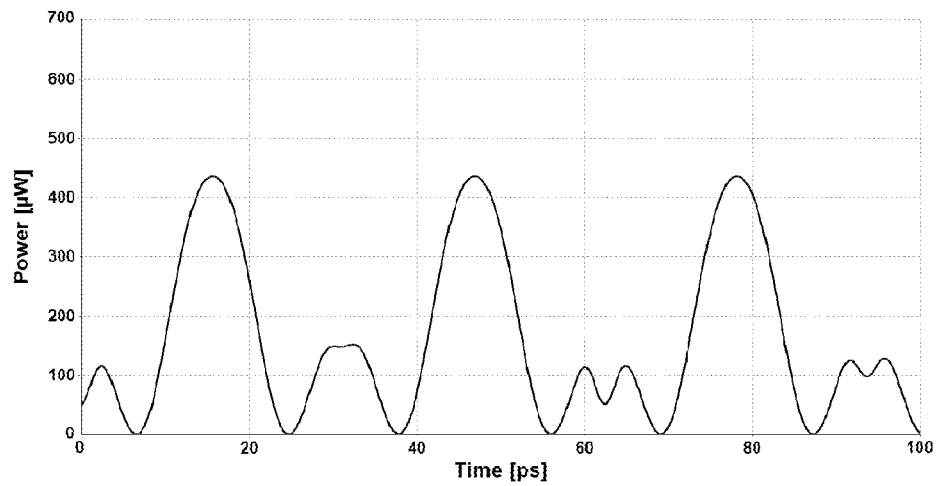
FIGS. 2P to 2R are exemplary illustrations of the simulated time waveform of an optical signal before the Gaussian optical filter with a 50% return-to-zero (RZ) pulse shape biased at $14/16\,V_\pi$ and its associated optical spectra before and after the Gaussian optical filter, respectively, in accordance with some embodiments of the present invention.
Figure 2Q:
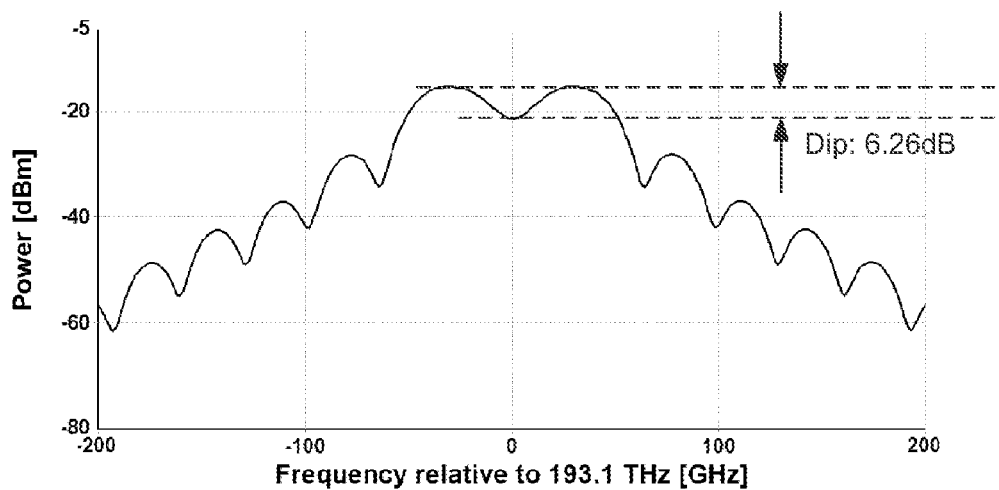
Figure 2R:
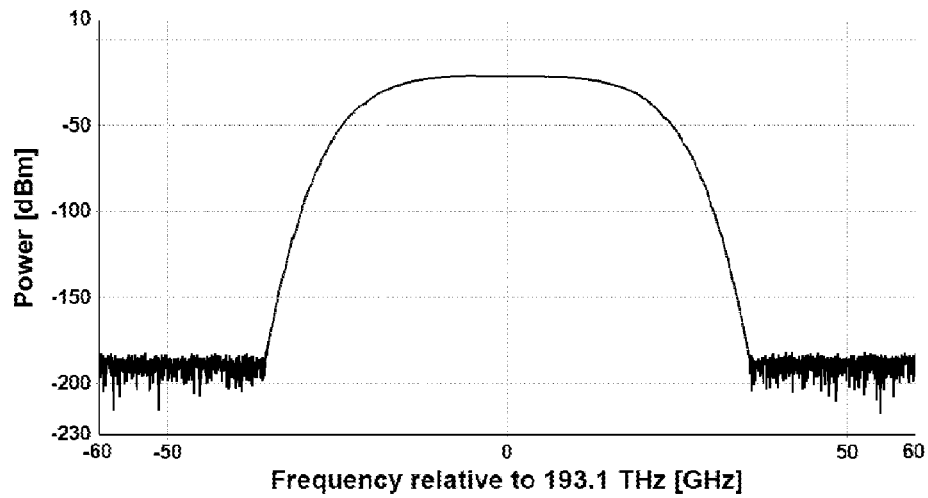

FIG. 2P is an exemplary illustration of a simulated time waveform of an optical signal before the Gaussian optical filter with a 50% return-to-zero (RZ) pulse shape biased at $14/16 V_\pi$ (i.e., a $6/16 V_\pi$ offset from the 50% RZ pulse shape). FIGS. 2Q and 2R are exemplary illustrations of the time waveform's associated optical spectra before and after the Gaussian optical filter, respectively, in accordance with some embodiments of the present invention.

Figure 2S:
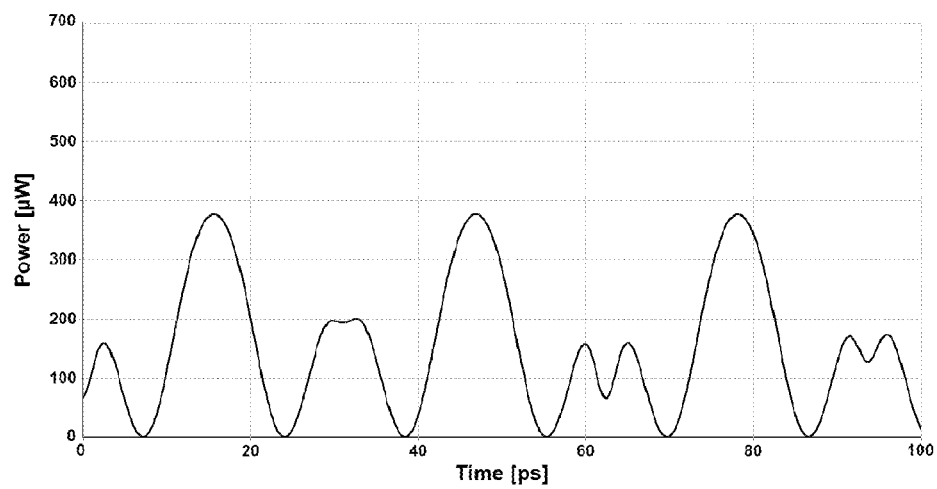
FIGS. 2S to 2U are exemplary illustrations of the simulated time waveform of an optical signal before the Gaussian optical filter with a 50% return-to-zero (RZ) pulse shape biased at $15/16\,V_\pi$ and its associated optical spectra before and after the Gaussian optical filter, respectively, in accordance with some embodiments of the present invention.
Figure 2T:
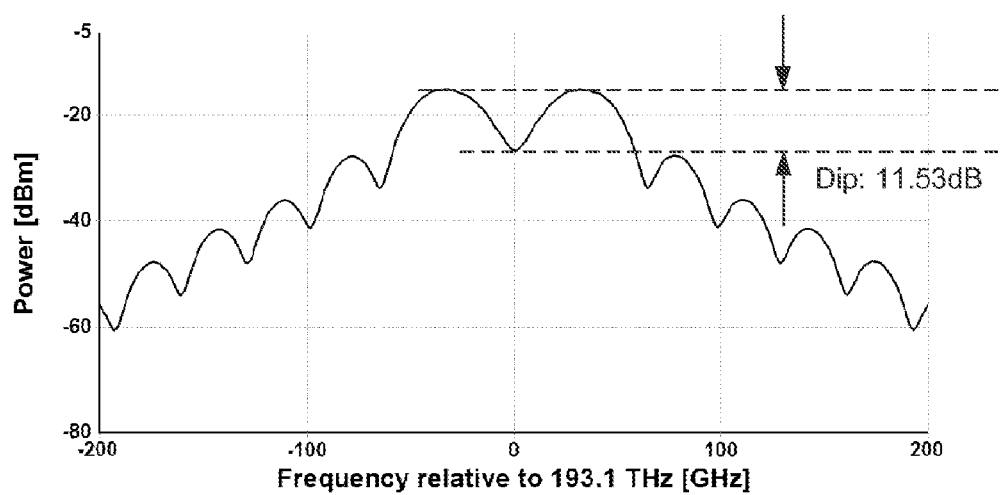
Figure 2U:
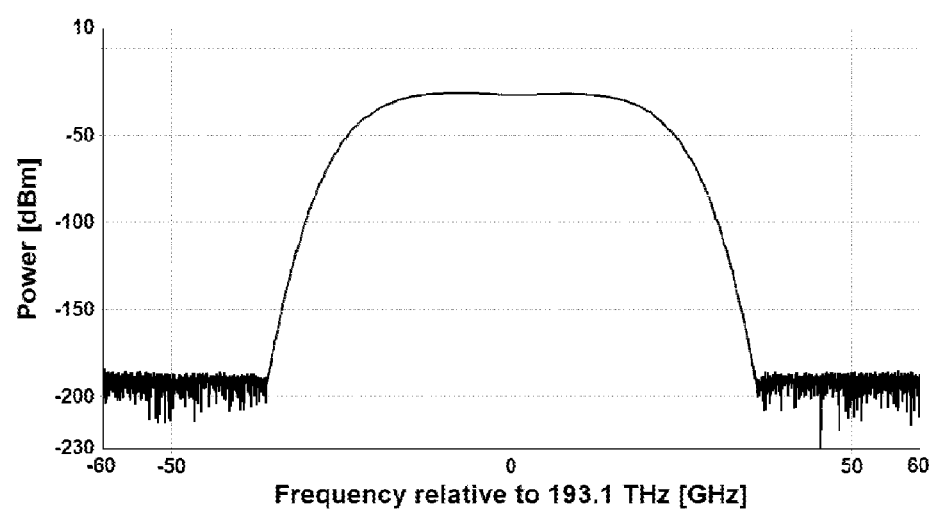

FIG. 2S is an exemplary illustration of a simulated time waveform of an optical signal before the Gaussian optical filter with a 50% return-to-zero (RZ) pulse shape biased at $15/16 V_\pi$ (i.e., a $7/16 V_\pi$ offset from the 50% RZ pulse shape). FIGS. 2T and 2U are exemplary illustrations of the time waveform's associated optical spectra before and after the Gaussian optical filter, respectively, in accordance with some embodiments of the present invention.

As can be seen from the optical spectra of the ORZ pulse shapes before the Gaussian optical filter shown in FIGS. 2H, 2K, 2N, 2Q, and 2T, respectively, the optical carrier suppression in the form of a dip near the center of the spectrum becomes more significant with the increase of the bias voltage offset that moves the bias point of the driving voltage toward the transmission minimum.

Figure 3:
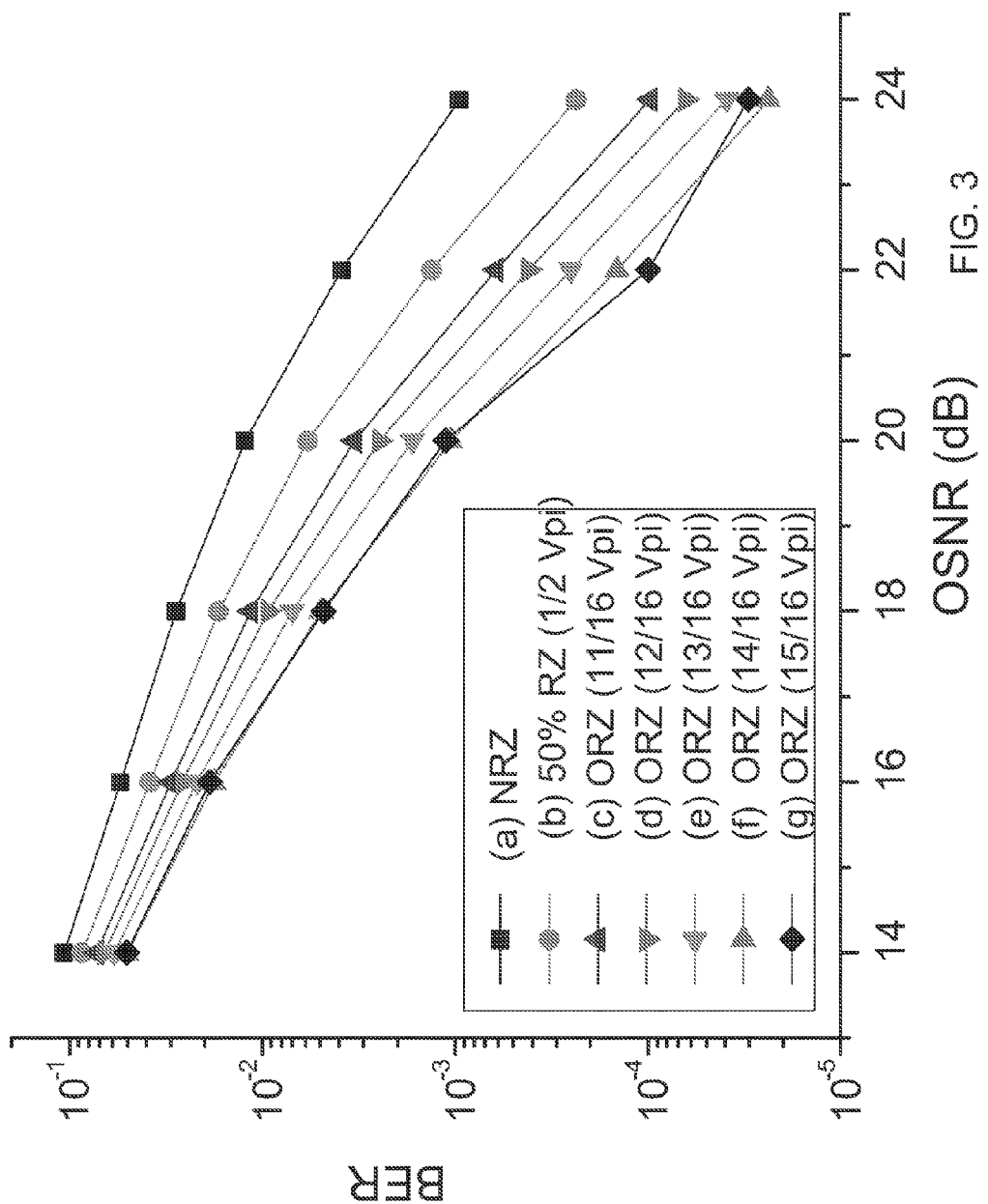
FIG. 3 is a block diagram illustrating the bit error rate performance of the optical transmitter as a function of the optical signal to noise ratio (OSNR) for a driving voltage having the original amplitude but different bias points with the optical filtering in accordance with some embodiments of the present invention.

FIG. 3 is a block diagram illustrating the bit error rate (BER) performance of the optical transmitter as a function of the optical signal to noise ratio (OSNR) for a driving voltage having the same amplitude but different bias points with the optical filtering in accordance with some embodiments of the present invention. In particular, for a given BER=$2\times10^{-2}$, the required OSNR is as follows:

| (a) NRZ | (b) 50% RZ | (c) ORZ at 11/16 $V_\pi$ | (d) ORZ at 12/16 $V_\pi$ | (e) ORZ at 13/16 $V_\pi$ | (f) ORZ at 14/16 $V_\pi$ | (g) ORZ at 15/16 $V_\pi$ |
|---|---|---|---|---|---|---|
| 18.82 dB | 17.59 dB | 16.85 dB | 16.51 dB | 16.15 dB | 15.77 dB | 15.87 dB |

Compared with 50% RZ pulse shape, the type-I ORZ having the bias point at $14/16 V_\pi$ (i.e., the curve (f) in FIG. 3) can achieve a maximum OSNR improvement of (17.59–15.77)=1.82 dB. In addition, the ONSR improvement is about (16.85–15.77)=1.08 dB from the type-I ORZ having the bias point at $11/16 V_\pi$ (i.e., the curve (c) in FIG. 3) to the type-I ORZ having the bias point at $14/16 V_\pi$ (i.e., the curve (f) in FIG. 3).

Figure 4:
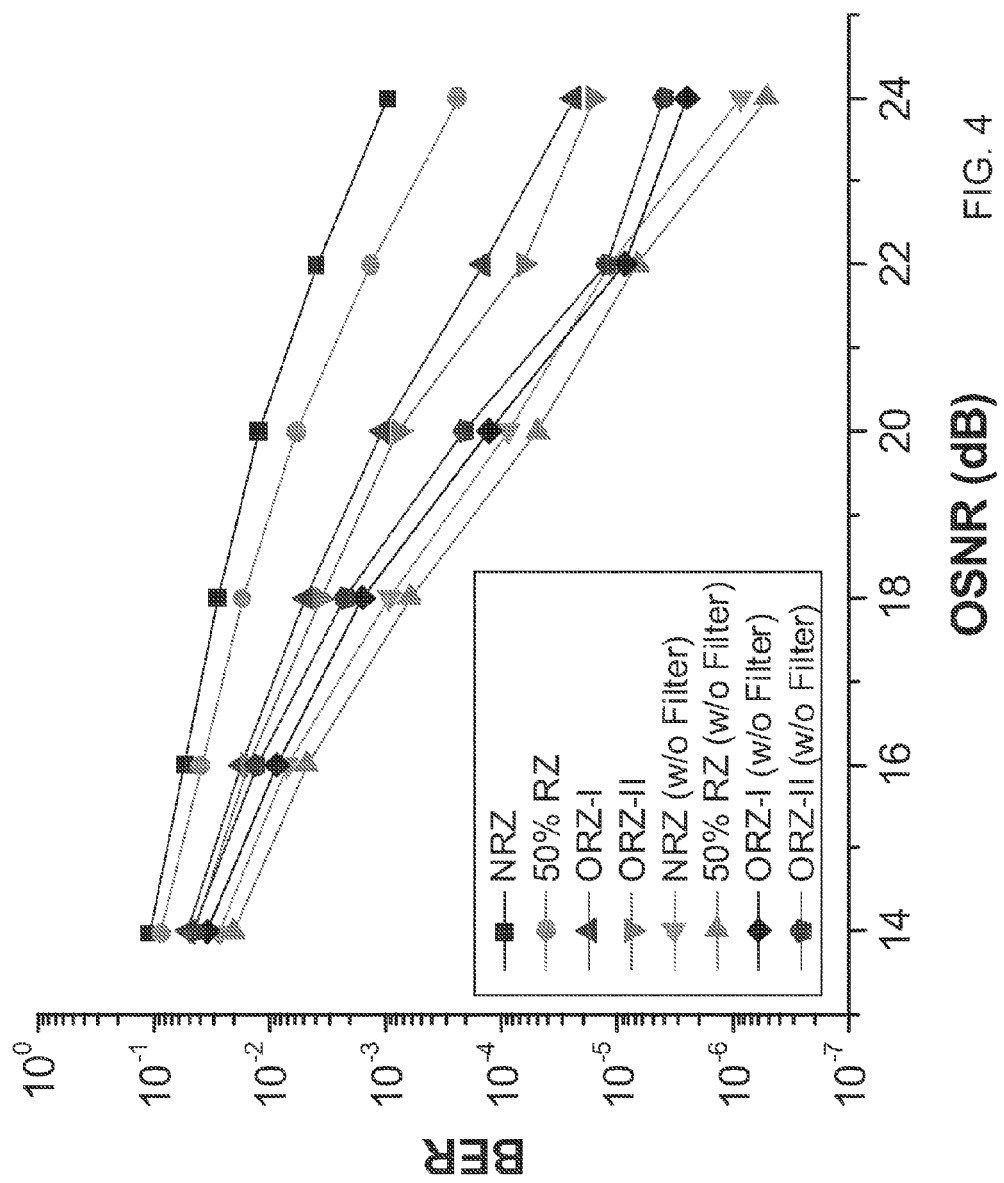
FIG. 4 is a block diagram illustrating the bit error rate performance of the optical transmitter as a function of the OSNR for a driving voltage having an increased amplitude and different bias points with or without optical filtering in accordance with some embodiments of the present invention.

FIG. 4 is a block diagram illustrating the BER performance of the optical transmitter as a function of the OSNR for a driving voltage having an increased amplitude and different bias points with or without optical filtering in accordance with some embodiments of the present invention. Note that both the type-I and type-II ORZ pulse shape have the same bias point at $^{14}/_{16} V_\pi$. For a given BER=$2\times10^{-2}$, the required OSNR is as follows:

|  | NRZ | 50% RZ | Type-I ORZ | Type-II ORZ |
|---|---|---|---|---|
| With Filter | 18.8 dB | 17.79 dB | 15.76 dB | 15.5 dB |
| Without Filter | 14.46 dB | 14.02 dB | 14.78 dB | 15.32 dB |

In other words, under the more aggressive optical filtering, the type-II ORZ outperforms type-I ORZ by (15.76–15.5)=0.26 dB with a low filtering penalty of merely (15.5–15.32)=0.18 dB. By contrast, 50% RZ suffers most from the optical filtering penalty as high as (17.79–14.02)=3.77 dB.

Figure 5:
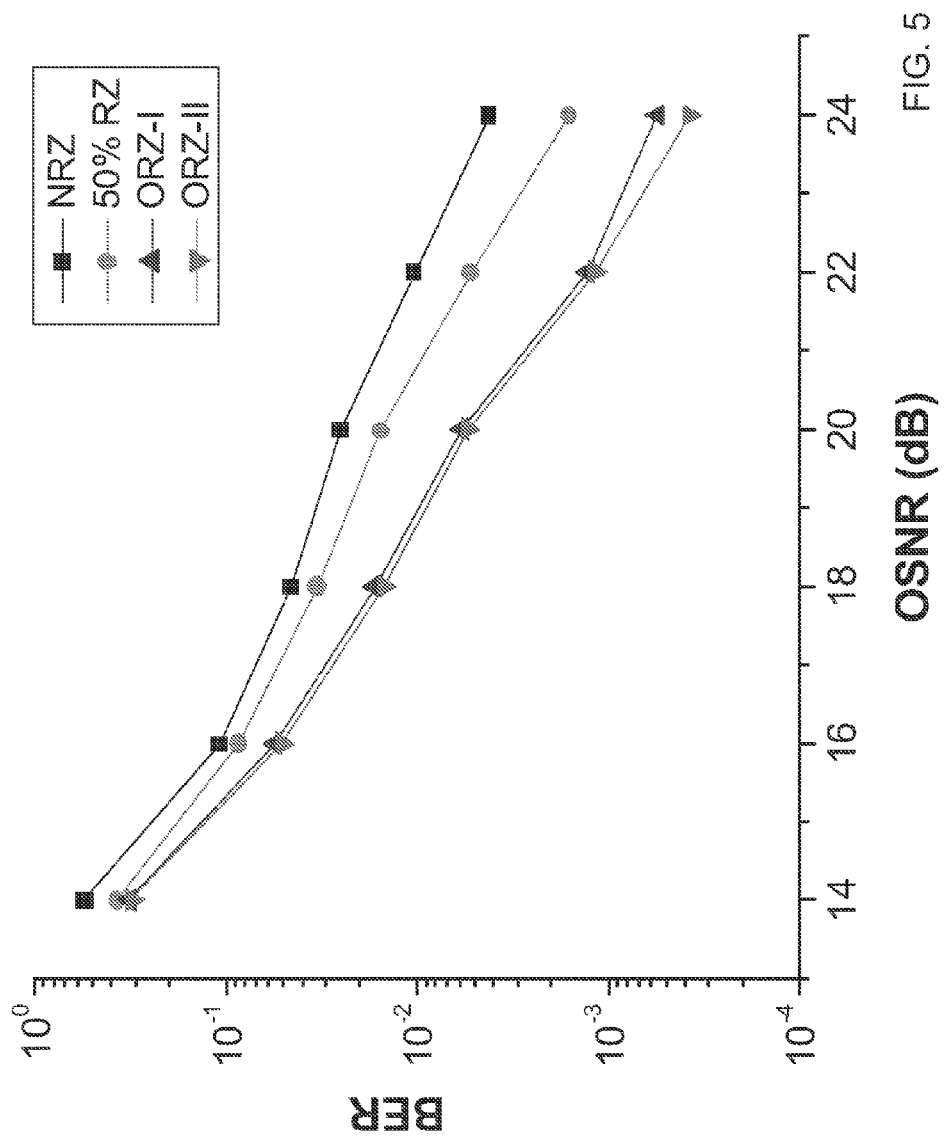
FIG. 5 is a block diagram illustrating the bit error rate performance of the optical transmitter after 1040 km SMF-28 fiber transmission with a 22 GHz aggressive optical filtering at the transmitter side in accordance with some embodiments of the present invention.

FIG. 5 is a block diagram illustrating the bit error rate performance of the optical transmitter after 1040 km SMF-28 fiber transmission with a 22 GHz aggressive optical filtering at the transmitter side in accordance with some embodiments of the present invention. The received OSNR at BER=$2\times10^{-2}$ is as follows:

|  | NRZ | 50% RZ | Type-I ORZ | Type-II ORZ |
|---|---|---|---|---|
| 1040 km SMF-28 | 20.51 dB | 19.93 dB | 17.69 dB | 17.52 dB |

Figure 6:
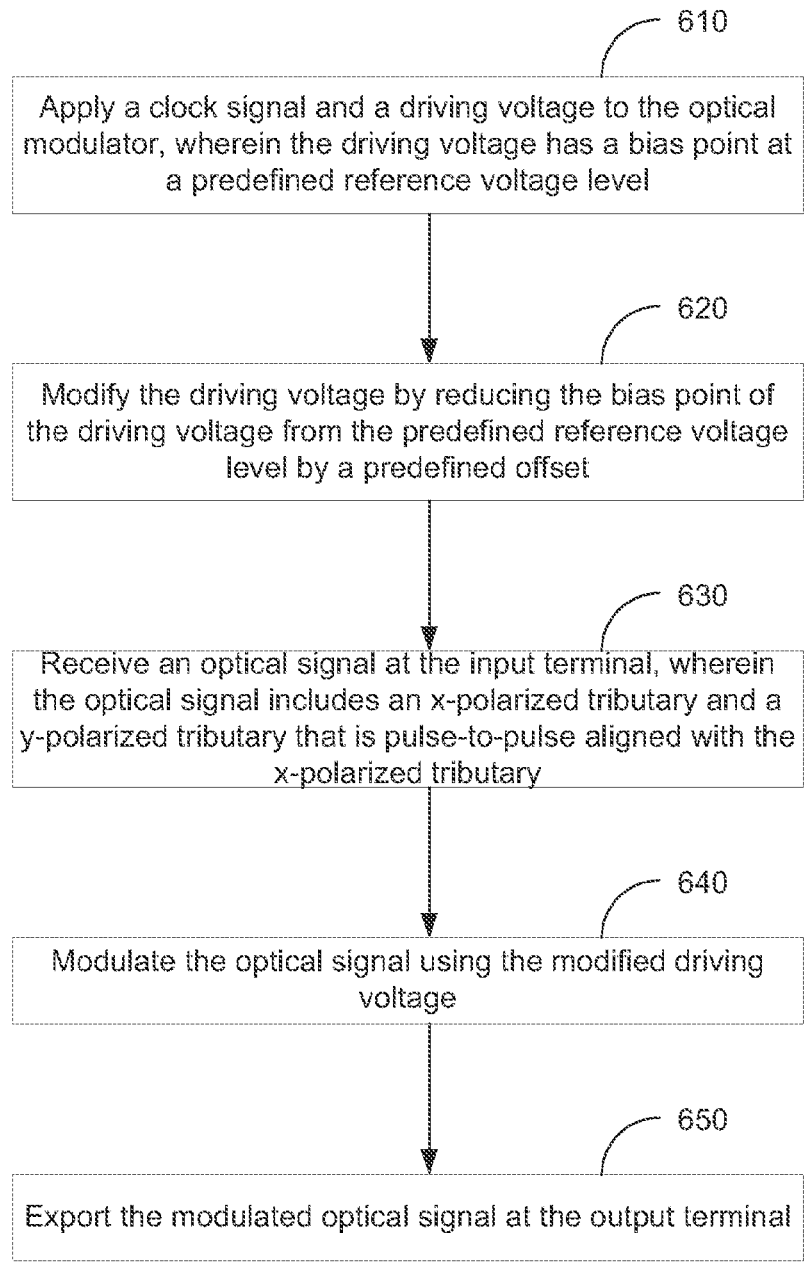
FIG. 6 is a block diagram illustrating of process of generating a signal having an optimized return-to-zero pulse shape using an optical modulator having an input terminal and an output terminal in accordance with some embodiments of the present invention.

FIG. 6 is a block diagram illustrating of process of generating a signal having an optimized return-to-zero pulse shape using an optical modulator having an input terminal and an output terminal in accordance with some embodiments of the present invention. The process begins with applying a clock signal and a driving voltage to the optical modulator (610), the driving voltage having a bias point at a predefined reference voltage level. In some embodiments, the predefined reference voltage level is approximately 50% of the driving voltage's original pre-offset magnitude. Next, the driving voltage applied to the optical modulator is modified by reducing the bias point of the driving voltage from the predefined reference voltage level by a predefined offset (620). In some embodiments, the predefined offset is approximately 37.5% of the driving voltage's original pre-offset magnitude. Sometimes, the driving voltage's post-offset magnitude is further increased by approximately twice of the predefined offset. The optical modulator receives an optical signal at the input terminal (630), the optical signal including an x-polarized tributary and a y-polarized tributary that is pulse-to-pulse aligned with the x-polarized tributary. The optical modulator then modulates the optical signal using the modified driving voltage (640) and exports the modulated optical signal at the output terminal of the optical modulator (650). In some embodiments, the optical modulator includes an optical path comprised of one or more polarization maintaining fibers and the optical modulator has an optical signal to noise ratio (OSNR) as a function of the predefined offset for a given bit error rate.

In some embodiments, an optical transmitter according to the present invention includes: first and second sets of optical in-phase and quadrature modulators, each set being coupled to a respective pair of electrical amplifiers for receiving two respective input signals; an integrable tunable laser assembly that is configured to generate a continuous-waveform optical signal; a first polarization beam splitter that is configured to divide the continuous-waveform optical signal into a x-polarized tributary and a y-polarized tributary, wherein each of the x-polarized tributary and the y-polarized tributary is modulated by one of the first and second sets of optical in-phase and quadrature modulators in accordance with the two respective input signals applied to the respective pair of electrical amplifiers; a second polarization beam splitter that is configured to combine the modulated x-polarized tributary and the modulated y-polarized tributary into one optical signal; and an optical modulator that is configured to modulate the combined optical signal using a driving voltage, wherein the driving voltage has a bias point that is reduced by a predefined offset from a predefined reference voltage level.

In summary, the present invention presents two new approaches of generating an optimized return-to-zero pulse shape against aggressive optical filtering by adjusting the bias point and/or increasing the driving voltage of an optical modulator. These two approaches can support any types of DWDM optical transmission regardless of the channel spacing and the modulation levels without introducing an extra complexity to established PM-QPSK systems. It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A method of generating a signal having an optimized return-to-zero pulse shape using an optical transmitter, the optical transmitter including first and second sets of optical in-phase and quadrature modulators, an integrable tunable laser assembly, a first polarization beam splitter, a second polarization beam splitter, and an optical modulator having an input terminal and an output terminal, the method comprising:

generating a continuous-waveform optical signal using the integrable tunable laser assembly and dividing the continuous-waveform optical signal into an x-polarized tributary and a y-polarized tributary using the first polarization beam splitter;

modulating the x-polarized tributary using the first set of optical in-phase and quadrature modulators in accordance with a pair of input signals applied to the first set of optical in-phase and quadrature modulators;

modulating the y-polarized tributary using the second set of optical in-phase and quadrature modulators in accordance with a pair of input signals applied to the second set of optical in-phase and quadrature modulators;

combining the modulated x-polarized tributary and the modulated y-polarized tributary into one optical signal using the second polarization beam splitter;

applying a clock signal and a driving voltage to the optical modulator, wherein the driving voltage has a bias point at a predefined reference voltage level;

modifying the driving voltage by reducing the bias point of the driving voltage from the predefined reference voltage level by a predefined offset;

receiving the optical signal from the second polarization beam splitter at the input terminal of the optical modulator, wherein the optical signal includes the x-polarized tributary and the y-polarized tributary that is pulse-to-pulse aligned with the x-polarized tributary;

modulating the optical signal using the modified driving voltage; and exporting the modulated optical signal at the output terminal of the optical modulator.

2. The method of claim 1, wherein the predefined reference voltage level is approximately 50% of the driving voltage's original pre-offset magnitude.

3. The method of claim 1, wherein the predefined offset is approximately 37.5% of the driving voltage's original pre-offset magnitude.

4. The method of claim 1, wherein the driving voltage's post-offset magnitude is further increased by approximately twice of the predefined offset.

5. The method of claim 1, wherein the optical modulator is a Mach-Zehnder modulator.

6. The method of claim 1, wherein the optical modulator includes an optical path comprised of one or more polarization maintaining fibers.

7. The method of claim 1, wherein the optical modulator's optical signal to noise ratio is a function of the predefined offset for a given bit error rate.

8. An optical transmitter, comprising:
first and second sets of optical in-phase and quadrature modulators, each set being coupled to a respective pair of electrical amplifiers for receiving two respective input signals;
an integrable tunable laser assembly that is configured to generate a continuous-waveform optical signal;
a first polarization beam splitter that is configured to communicatively couple the integrable tunable laser assembly to the first and second sets of optical in-phase and quadrature modulators, respectively, and divide the continuous-waveform optical signal into a x-polarized tributary and a y-polarized tributary, wherein each of the x-polarized tributary and the y-polarized tributary is modulated by one of the first and second sets of optical in-phase and quadrature modulators in accordance with the two respective input signals applied to the respective pair of electrical amplifiers;
a second polarization beam splitter that is configured to communicatively couple the first and second sets of optical in-phase and quadrature modulators to an optical modulator and combine the modulated x-polarized tributary and the modulated y-polarized tributary into one optical signal; and
the optical modulator that is configured to modulate the combined optical signal using a driving voltage, wherein the driving voltage has a bias point that is reduced by a predefined offset from a predefined reference voltage level.

9. The optical transmitter of claim 8, wherein the predefined reference voltage level is approximately 50% of the driving voltage's original pre-offset magnitude.

10. The optical transmitter of claim 8, wherein the predefined offset is approximately 37.5% of the driving voltage's original pre-offset magnitude.

11. The optical transmitter of claim 8, wherein the driving voltage's post-offset magnitude is further increased by approximately twice of the predefined offset.

12. The optical transmitter of claim 8, wherein the optical modulator is a Mach-Zehnder modulator.

13. The optical transmitter of claim 8, wherein the optical modulator includes an optical path comprised of one or more polarization maintaining fibers.

14. The optical transmitter of claim 8, wherein the optical modulator's optical signal to noise ratio is a function of the predefined offset for a given bit error rate.

* * * * *